United States Patent [19]

Wagensonner et al.

[11] 4,398,813
[45] Aug. 16, 1983

[54] PHOTOGRAPHIC CAMERA

[75] Inventors: Eduard Wagensonner, Aschheim; Karl Wagner, Munich; Bernhard von Fischern, Ottobrunn, all of Fed. Rep. of Germany

[73] Assignee: Agfa-Gevaert AG, Leverkusen, Fed. Rep. of Germany

[21] Appl. No.: 303,016

[22] Filed: Sep. 17, 1981

[30] Foreign Application Priority Data

Sep. 29, 1980 [DE] Fed. Rep. of Germany ....... 3036678

[51] Int. Cl.³ .............................................. G03B 7/097
[52] U.S. Cl. .................................. 354/23 D; 354/38
[58] Field of Search ....................... 354/29, 30, 36, 38, 354/23 D, 60 A, 43, 44, 50, 51

[56] References Cited

U.S. PATENT DOCUMENTS 3,748,979 7/1973 Wada .................................. 354/23 D
4,054,887 10/1977 Holle et al. ........................ 354/38 X
4,251,141 2/1981 Stemme et al. .................... 354/60 A

FOREIGN PATENT DOCUMENTS

55-2260 1/1980 Japan .................................. 354/23 D

Primary Examiner—William B. Perkey
Attorney, Agent, or Firm—Michael J. Striker

[57] ABSTRACT

A photographic camera with automatic setting of diaphragm and exposure time. A light sensitive circuit generates pulses and is connected to a diaphragm counting stage for comparing signals from the light sensitive circuit with preset signals in the diaphragm counting stage and for providing a stop pulse to an electromagnetic diaphragm setting stage. A counter is connected to a pulse generator and to the diaphragm counting stage in a stop control connection. A start control provision connects the output of the diaphragm counting stage to an exposure time forming stage. The exposure time forming stage can be connected to the counter for providing automatic setting of the time determining part of the exposure time forming stage depending on the counting state of the counter. A shutter opening member can be connected to the diaphragm counting stage for receiving a control signal for the release part of the shutter opening member.

26 Claims, 6 Drawing Figures

PHOTOGRAPHIC CAMERA

BACKGROUND OF THE INVENTION

1. Field of the Invention

The invention relates to a photographic camera with a diaphragm setting device providing light dependent and automatic setting of the aperture diaphragm and with an exposure time provision electronically operated following the diaphragm formation.

2. Brief Description of the Background of the Invention

Photographic cameras comprise a shutter for controlling the time during which light is allowed to fall on the film. In electronic shutters the length of the opening time of the shutter is timed electronically. Suitable times have been provided by discharging capacitors through an electromagnet, which stops the shutter closing. This has allowed integration of shutter and exposure metering systems for automatic exposure control.

An iris diaphragm is in general a circular mechanical device, whose diameter can be varied continuously and which controls the amount of light reaching the film in a camera.

SUMMARY OF THE INVENTION

1. Purposes of the Invention

It is an object of the present invention to provide a photographic camera with a diaphragm setting provision for adjusting automatically the aperture diaphragm depending on the light level and with a following automatic actuation of an electronic exposure time forming device.

It is another object of the invention to provide automatic diaphragm and shutter control in a camera such that the iris formation and the time setting at least in a first region of illumination between a large brightness and an average brightness are in a certain relation.

It is a further object of the present invention to avoid a conventional diaphragm-shutter time characteristic known as triangle characteristic.

These and other objects and advantages of the present invention will become evident from the description which follows.

2. Brief Description of the Invention

The present invention provides a photographic camera with a diaphragm setting device which comprises a light sensitive circuit generating pulses, an electromagnetic diaphragm setting stage, a diaphragm counting stage connected to the light sensitive circuit for comparing signals from the light sensitive circuit with preset signals and for providing a stop pulse to the electromagnetic diaphragm setting stage, a counter connected to a pulse generator and to the diaphragm counting stage, which is a stop control connection. A start control provision connects the output of the diaphragm counting stage to the exposure forming stage.

The exposure time forming stage can be connected to the counter for providing automatic setting of the time determining part of the exposure time forming stage depending on the counting state of the counter. A shutter opening member can be connected to a diaphragm counting stage for receiving a control signal for the release part of the shutter opening member.

A connection means can be provided between the exposure time forming stage and the counter for automatically adjusting the value of the time determining member of the exposure time forming stage depending on the counting value of the counter. A diaphragm can be connected to the electromagnetic diaphragm setting stage for providing a light dependent and automatic setting of the diaphragm. The exposure forming stage can be connected for being turned on after the setting of the diaphragm. An amplifier can be connected to the electromagnetic diaphragm setting stage, where the diaphragm counting stage comprises a reversible counter which can be set to a certain counting contents and the transfer output of which is connected to the amplifier input.

An AND gate can be provided having its output connected to the clock input of the counter. A timing pulse generator can be connected to the input of the AND gate, where the cycle period is short compared to the shortest time for forming the diaphragm provided by the diaphragm counting stage. A memory flip-flop can have its output Q connected to the second input of the AND gate and can have its reset input R connected to the transfer pulse output of the diaphragm counting stage for switching off the memory flip-flop. A starting switch can be connected to the light sensitive circuit and to the clock input of the memory flip-flop. Preferably, the memory flip-flops are D-flip-flops.

The exposure time forming stage can comprise a digital-analog converter stage connected to an output of the counter, a voltage-current converter connected to the output of the digital analog converter stage, a capacitor can be connected to the voltage-current converter and a second memory flip-flop can be connected to the electromagnetic diaphragm setting stage. Further, the digital-analog converter can be connected with its set input S to the transfer output U of the diaphragm counting stage.

A digital-analog converter can be part of the exposure time forming circuit and can be connected to an output of the counter. A memory flip-flop can be controlled through its set input S by the output voltage ($U_Q$) of the digital analog converter serving then as a threshold voltage $U_S$ and can have a control input connected to a timing element comprising a capacitor and a resistor.

The exposure time forming stage can comprise a reversible time forming counter connected to the output of the counter and the set input of the reversible counter can be connected to the transfer output U of the diaphragm counting stage and the clock input of the diaphragm counting stage can be connected to the output of a second pulse generator having an adjustable frequency and the transfer output U of the time forming counter can actuate a shutter closing magnet. A diaphragm setting member can be actuated by the diaphragm counting stage. The frequency of the second pulse generator can be adjustable depending on the characteristic course of the diaphragm setting member. The frequency of the second pulse generator can also be adjustable depending on the sensitivity of the film employed.

The exposure forming stage can comprise a bidirectional counter connected with its input U' reversing the counting direction to the transfer output of the diaphragm counting stage for providing control. A second AND gate can have its output connected to the clock input of the bidirectional counter and one input of the second AND gate can be connected to a third pulse generator and a second input of the second AND gate can be connected to the transfer output U of the diaphragm counting stage via a second memory flip-flop. A third AND gate can be connected with its output to the clock input of the bidirectional counter and can have an input connected to the first pulse generator and a second input connected to the output of the first memory flip-flop. The memroy flip-flop can be a D-flip-flop and the clock input of the D-flip-flop can be connected to a starting switch and the reset input R of the D-flip-flop can be connected to the transfer output U of the diaphragm counting stage. The shutter can have its opening mechanism controlled by the electromagnetic diaphragm setting stage. Alternatively, the shutter can have its closing mechanism controlled by the electromagnetic diaphragm setting stage.

There is also provided a method for controlling the exposure provided in a photographic camera which comprises converting light radiation into electrical pulse signals, comparing the pulse signals with a preset count in a diaphragm counting stage, generating a stop pulse upon finding equivalence between the pulse signals and a preset condition, feeding the stop pulse to a diaphragm setting stage, feeding a control signal from the diaphragm counting stage to the release part of a shutter opening member, switching a counter having a timing pulse generator at about the same time as the diaphragm counting stage and stop-controlling the counter with the output of the diaphragm counting stage. An exposure time forming stage can be start-controlled with the output of the diaphragm counting stage and the value of the time determining member of the exposure time forming stage can be automatically adjusted depending on the counting state of the counter.

The transfer output of the diaphragm counting stage constructed as a reversible counter, which can be adjustable to a defined counting state contents can be fed via an amplifier to a diaphragm electromagnet. The signal from the timing pulse generator having a cycle period short as compared to the shortest time of formation of the diaphragm of the diaphragm counting stage can be fed to the input of an AND gate, the output Q of a memory flip-flop can be fed to a second input of the AND gate and the output of the AND gate can be fed to the clock input of the counter. The memory flip-flop can be switched with a starting switch via its clock input T. The memory flip-flop can be switched off through a transfer pulse of the diaphragm counting stage via its reset input R.

The output of the counter can be fed to a digital analog converter stage, the output of the digital-analog converter stage can be fed to a voltage-current converter and the output of the voltage-current converter can be fed to a timing capacitor and to a following memory flip-flop. The signal from the memory flip-flop can be fed to an electromagnet. The transfer output of the diaphragm counting stage can be fed to the set input of the digital-analog converter stage.

The transfer output of the diaphragm counter stage can be fed to the clock input of a second memory flip-flop for controlling the second memory flip-flop, the output of which is connected to the shutter release magnet. The output of the counter can be fed to a digital-analog converter stage and the output of the digital-analog converter stage can be fed to a memory flip-flop as a control voltage for setting a threshold voltage.

The output of the counter can be fed to a time forming reversible counter, the transfer output of the diaphragm counting stage can be fed to the set input of the time forming counter, the output of the second adjustable pulse generator can be fed to the time forming counter and a shutter closing magnet can be actuated by way of the transfer output of the time forming counter.

The frequency of the adjustable second pulse generator can be provided adjustable depending on the characteristic course of the diaphragm setting member and/or depending on the sensitivity of the film employed.

The output of a second AND gate can be fed to the clock input of a bidirectional counter, an input of the second AND gate can be fed with the output of a third pulse generator and a second input of the AND gate can be fed with the transfer output of the second diaphragm counting stage via a second memory flip-flop. The transfer output of the diaphragm counting stage can be fed to the counting direction reversing input of the bidirectional counter. The output of a third AND gate can be fed to the clock input of the bidirectional counter. The output Q of a first D-flip-flop can be fed to an input of the third AND-gate and the output of the first pulse generator can be fed to a third input of the second AND gate. The clock input of the first D-flip-flop can be switched with a starting switch and the transfer output of the diaphragm counting stage can be fed to the reset input R of the first D-flip-flop.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawings in which are shown several of the possible embodiments of the present invention

DESCRIPTION OF THE INVENTION AND PREFERRED EMBODIMENTS

In accordance with the present invention there is provided a photographic camera comprising a pulse generator connected to a light sensitive frequency part and the pulse generator is connected to a diaphragm counting stage. The diaphragm counting stage contains a presettable counting contents and which generates after reaching or respectively after reading of the counting contents a stop-pulse for an electromagnetic diaphragm setting stage interrupting the setting motion of the diaphragm provision. A control signal is derived from the output of the diaphragm counting stage for a release provision of the shutter opening member. A time counting provision comprising a timing pulse generator is provided which is turned on simultaneously with the switching on of the diaphragm counter stage. The output of the diaphragm counting stage is connected with a start control connection to an exposure time forming stage and the value of the time determining member of the exposure time forming stage is set automatically depending on the counting state in each case of the time counting provision.

This provides the advantage that a control signal is generated for the electromagnetic diaphragm setting stage with the aid of a diaphragm counter counting forward to a certain count setting or respectively with the aid of a diahragm counter counting backwards from a certain count state. This allows to provide the electromagnetic actuation provision as an electromagnet, the plunger of which stops the course of motion of the diaphragm member. On the other hand, it is also possible to employ a d-c motor or a step motor as an electromagnetic diaphragm setting provision, which is stopped upon reaching of the set point value of the diaphragm. During the diaphragm forming time a time counter is in operation, which is switched further by a pulse or respectively clock generator. The number of pulses counted during the diaphragm forming time is a measure for the exposure time proper. The shutter is opened by a control pulse generated at the end of the diaphragm formation.

In accordance with a further feature of the present invention the clock input of the time counter is connected via an AND gate on the one hand to the clock generator having a period duration short as compared with the shortest diaphragm forming time of the diaphragm counting stage and on the other hand to a memory flip-flop stage, which can be turned on via its clock input with a starting switch and which can be turned off via its reset input with the transfer pulse of the diaphragm counting stage. Therefor, the pulse generator in a simple construction becomes only then effective, when the starting switch is actuated and the memory flip-flop is switched to the corresponding position.

A control connection is provided from the transfer output of the diaphragm counting stage to the clock input of a further memory flip-flop, the output of which is connected to a shutter opening magnet. Advantageously, both memory flip-flops can be D-flip-flops.

In accordance with another embodiment a single magnet can be provided as a diaphragm magnet and as a shutter opening magnet or shutter release magnet. Advantageously, the electromagnet is provided as a holding magnet. Upon deenergization of the magnet the falling plunger effects a stop of the diaphragm member running from its rest position and on the other hand a release of the shutter opening member.

In accordance with a first embodiment the exposure time forming stage comprises a digital analog converter stage following the counter counting the time, a voltage-current converter, a time capacitor connected in series with the voltage-current converter, a memory flip-flop and an electromagnet. The voltage-current converter serves in some respects as the current generator for the time capacitor and determines the charging time of the capacitor.

Advantageously, the digital analog converter is connected via its set input to the transfer output of the diaphragm counting stage. This means that upon the presence of a control pulse at the set input the respective digital signal combination is stored in the converter.

In accordance with a further embodiment the exposure time forming stage comprises a time forming counter following to the counter counting time. The time forming counter is provided as a reversible counter and its set input is connected to the transfer output of the diaphragm counting stage and its clock input is connected to the clock input of a pulse generator having an adjustable clock frequency and where the transfer output of the time forming counter acts upon the shutter closing magnet. The frequency of the pulse generator can be adjusted depending on the run down characteristic of the diaphragm member and/or on the sensitivity of the film employed.

In accordance with a further embodiment of the invention the exposure time forming stage comprises a digital-analog converter following to the time counter. The output voltage of the digital-analog converter stage serves as a control voltage for setting a threshold voltage of a memory flip-flop, the control input of which is connected to a timing member comprising a resistor and a capacitor.

In accordance with another embodiment the exposure time forming stage comprises a memory flip-flop, a diaphragm magnet, a clock generator with an adjustable or respectively settable frequency and an AND-gate, which has its output connected to the clock input of a bidirectional counter. The first input of the AND gate is connected to the clock generator and the second input of the AND gate is controlled with the transfer signal of the diaphragm counting stage. A control connection runs from the transfer output of the diaphragm counting stage to the input reversing the counting direction of the time counter. The clock input of the bidirectional counter is connected to another AND gate, an input of the AND gate being connected to the timing pulse generator and the second input being connected to the Q-output of a D-flip-flop. Advantageously, the first clock generator is effectively connected during the diaphragm formation via the AND gate and corresponding to the diaphragm formation given by the brightness of illumination a corresponding number of pulses are counted. After termination of diaphragm formation upon occurrence of the transfer pulse at the diaphragm counting stage, the first pulse generator is switched ineffective and via the second AND gate the second pulse generator is switched ineffective. The clock frequency of the second pulse generator is tuned such to the frequency of the first pulse generator that under consideration of the diaphragm setting in each case a proper exposure time is formed. For obtaining a proper exposure therefor the second pulse generator or respectively clock generator is adjustable in its frequency.

Figure 1:
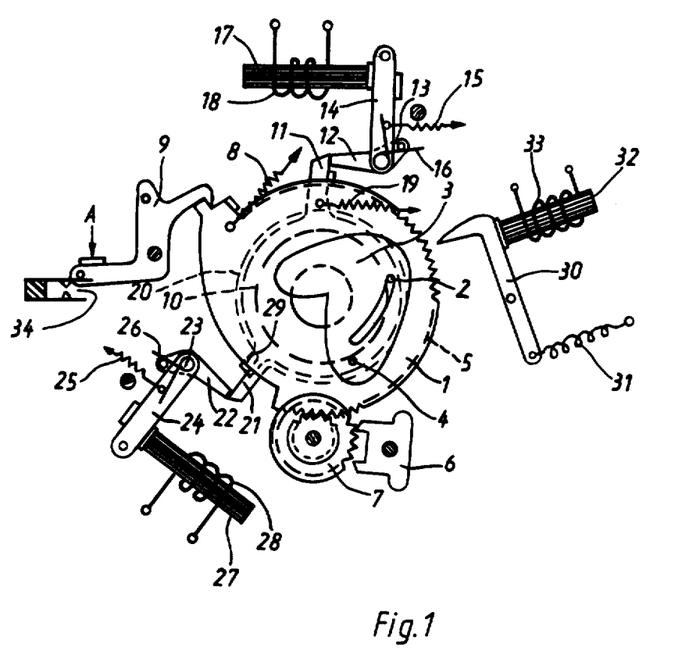
FIG. 1 is a view of a schematic representation of a shutter.

Referring now to FIG. 1 there is designated as 1 a diaphragm setting ring, which is connected to a diaphragm blade 3 via a pin-slot connection 2, which can be tilted around an axis 4 fixed relative to the camera. For simplicity only one blade of the diaphragm is shown. The diaphragm setting ring 1 is provided with teeth 5 coacting with a mechanical drag provision 6, 7. The diaphragm setting ring 1 is under the effective force of a spring 8 and is maintained in the position shown by a release lever 9. A shutter opening member is designated as 10, which is provided with an extension 11. The shutter opening member is maintained in the starting position with a release lever 12. The release lever 12 can be rotated around an axis 13, which is provided at a solenoid plunger lever 14. The spring 15 is connected to the solenoid plunger lever 14. A leg spring 16 engages the release lever 12 and the solenoid plunger lever 14. A release magnet formed as a holding magnet comprises a plunger 17 and a solenoid 18.

The moving spring 19 engages the shutter opening member.

A shutter closing member is designated as 20. The shutter closing member 20 is provided with an extension 21, disposed at the release lever 22. The release lever 22 can be rotated around an axis 23, which is provided at the plunger lever 24. The plunger lever 24 is connected to a spring 25. A leg spring 26 is effective between the release lever 22 and the plunger lever 24. The plunger lever 24 is disposed at the plunger 27 of a shutter closing magnet, the coil of which is designated as 28. The shutter closing member 20 is maintained in the starting position by way of an extension of the shutter opening member 10. This extension is designated as 29.

A pawl lever 30 engages the diaphragm member 1. A spring 31 engages the pawl lever 30. A diaphragm magnet comprises a plunger 32 and a coil 33. An operating switch or respectively a release switch 34 can be closed with the release lever 9.

Figure 2:
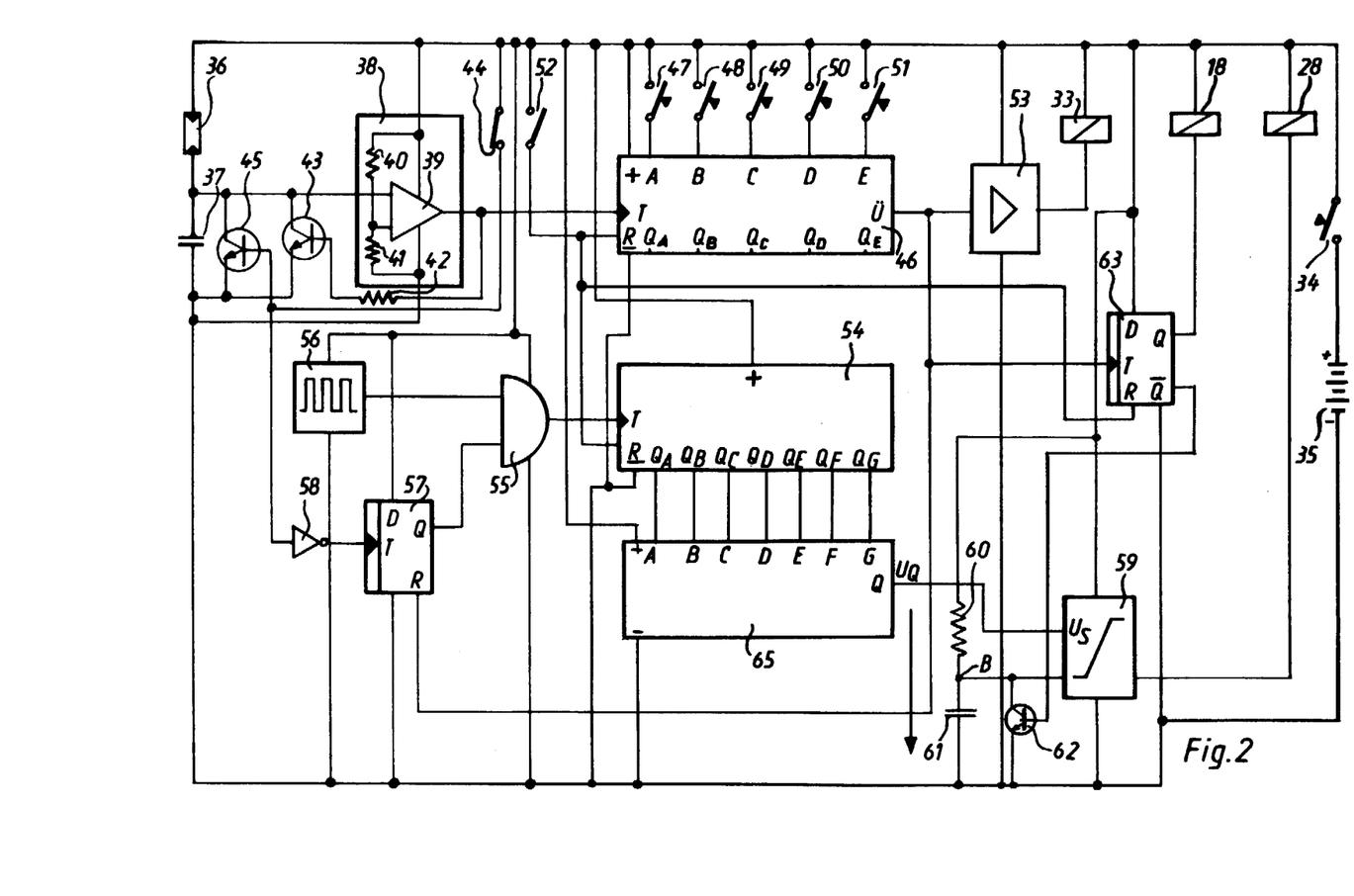
FIG. 2 is a view of a first circuit diagram for forming the exposure time value.

A battery is designated as 35 in FIG. 2 and the plus pole of the battery can be connected to the switching circuit via the release switch 34. A light sensitive timing circuit comprises a photo detector 36 and a charging capacitor 37. The connection point between the photo detector 36 and the charging capacitor 37 is connected to the input of the threshold memory flip flop 38, which comprises an operational amplifier 39 and a voltage divider 40, 41. A control connection leads from the output of the threshold flip-flop 38 via a resistor 42 to the base of a switching transistor 43, the collector-emitter binder of which is connected in parallel to the time capacitor 37. The elements 36 to 43 form a light sensitive pulse generator, the frequency of which is determined by the light-sensitive detector 36 and the timing capacitor 37.

A start switch 44 can be actuated by the release lever 9 or an extension of the diaphragm member 1 not shown. The start switch 44 is connected to the base of a switching transistor 45, which is blocked after the opening of the switch 44 and which thereby switches on the light sensitive pulse generator.

The output of the light sensitive pulse generator is connected to the clock input T of a reversible counter 46, the inputs A, B, C, D, E of which are connected to switches 47, 48, 49, 50, 51. A preset signal combination is applied to the reversible counter 46 via these switches 47 to 51, which fixes the counting contents of this counting stage. The reset input R of this reversible counter 46 is connected to a reset key switch 52. The transfer output U of the diaphragm counting stage 46 is connected to the input of the amplifier 53, which has connected its output to provide current to the diaphragm magnet 33.

A time counter is designated as 54, which has its clock input T connected to an AND gate 55. The first input of the AND gate 55 is connected to a pulse generator 56 the frequency of which is large compared with the reciprocal of the shortest possible diaphragm forming time. The second input of the AND gate 55 is connected to the Q-output of a D-flip-flop 57, the clock input T of which is connected to the start contact 44 via an inverter 58. The D-input is connected to the plus pole of the battery 35 and the input R is connected to the transfer output U of the diaphragm counting stage 46.

The outputs $Q_A$ to $Q_G$ are connected to the inputs A to G of a digital-analog converter, at the output Q of which appears an analog voltage $U_Q$. This output Q is connected to the threshold input $U_S$ of a flip-flop 59 and the output circuit of the flip-flop 59 contains the shutter closure magnet 28.

A timing member comprises a resistor 60 and a capacitor 61, the junction point B of which is connected to the flip-flop 59. The resistor 60 is connected to the plus pole of the battery 35. A switching transistor 62 is connected in parallel to the timing capacitor 61. The base of the switching transistor 62 is connected to the output Q of a further D-flip-flop 63. The clock input of this D-flip-flop 63 is connected to the transfer output U of the diaphragm counting stage 46. The reset input R of this flip-flop 63 is connected to the reset switch 52.

The mode of operation is as follows:

After closing of the operation or respectively release switch 34 simultaneously the diaphragm member is released for the run down motion. In addition the starting switch 44 is opened and the light sensitive pulse generator 36 to 45 is turned on. Now continuously pulses are counted in the diaphragm counter 46, at the output U of which, after the reading out of the preset signal combination, a control pulse occurs, which is amplified by an amplifier 53 and which effects a deenergization of the diaphragm magnet 33. This provides the result that the pawl-like plunger extension 30 engages the teeth of the diaphragm member 1 and stops the same.

With the opening of the starting switch 44 in addition a positive pulse is fed to the clock input of the D-flip-flop 57 and the plus potential is switched to the output Q. Beginning with this point in time the pulse signals of the pulse generator 56 are counted in the time counter 54. Upon appearing of the control pulse at the transfer output of the diaphragm counting stage 46 the D-flip-flop 57 is reset via the R-input and the AND gate 55 is blocked with the result that no additional pulses of the pulse generator 56 can be entered into the time counter 54. An analog voltage corresponding to the digital signal combination is produced in the digital-analog converter 65 and the voltage is applied as threshold voltage to the flip-flop stage 59.

By way of the transfer pulse at the diaphragm counting stage 46 the D-flip-flop 63 is pulsed with the result that on the one hand the shutter opening magnet 18 is deenergized through the potential jump from "0" to "1" and thus the shutter opening member is released for the run down motion and that on the other hand the starting transistor 62 is blocked by the potential jump from "1" to "0" and therewith the charging of the time capacitor 61 is initiated. After a certain interval of time coordinated to the diaphragm value in each case the shutter closing magnet 28 is deenergized and the shutter member is released for the run down motion.

Figure 3:
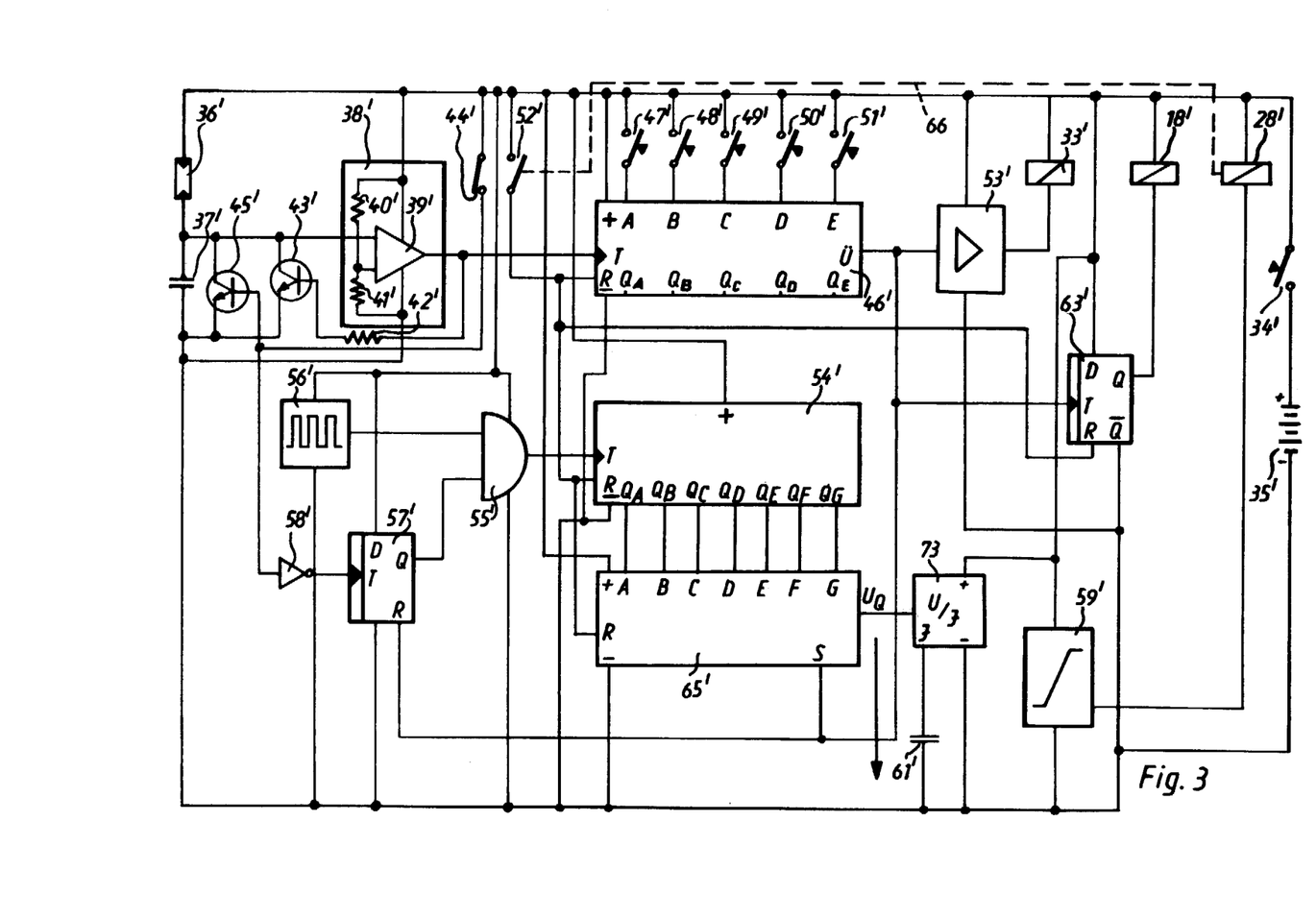
FIG. 3 is a view of a circuit diagram of a second embodiment for forming the exposure time value.

Corresponding parts in the embodiment according to FIG. 3 are given the same reference numerals as the same parts shown in FIG. 2. For distinction, however, indices have been provided. In contrast to the embodiment of FIG. 2 a set pulse is fed to the digital analog converter 65' upon the appearance of the transfer signal at the output U of the diaphragm counting stage 46' and the digital signal combination applied to the inputs of the digital-analog converter 65' is stored in the digital-analog converter. The analog voltage $U_Q$ produced at the output of the digital-analog converter 65' is converted in a voltage-current converter 73 into a current of corresponding size, which is fed to the time capacitor 61'. In addition, a control connection 66 is provided between the reset switch 52' and the shutter closing magnet 28': The reset switch 52' is therefor actuated at the end of the time of shutter formation whereby the counters 46', 54' and the digital-analog converter 65' are reset.

Figure 4:
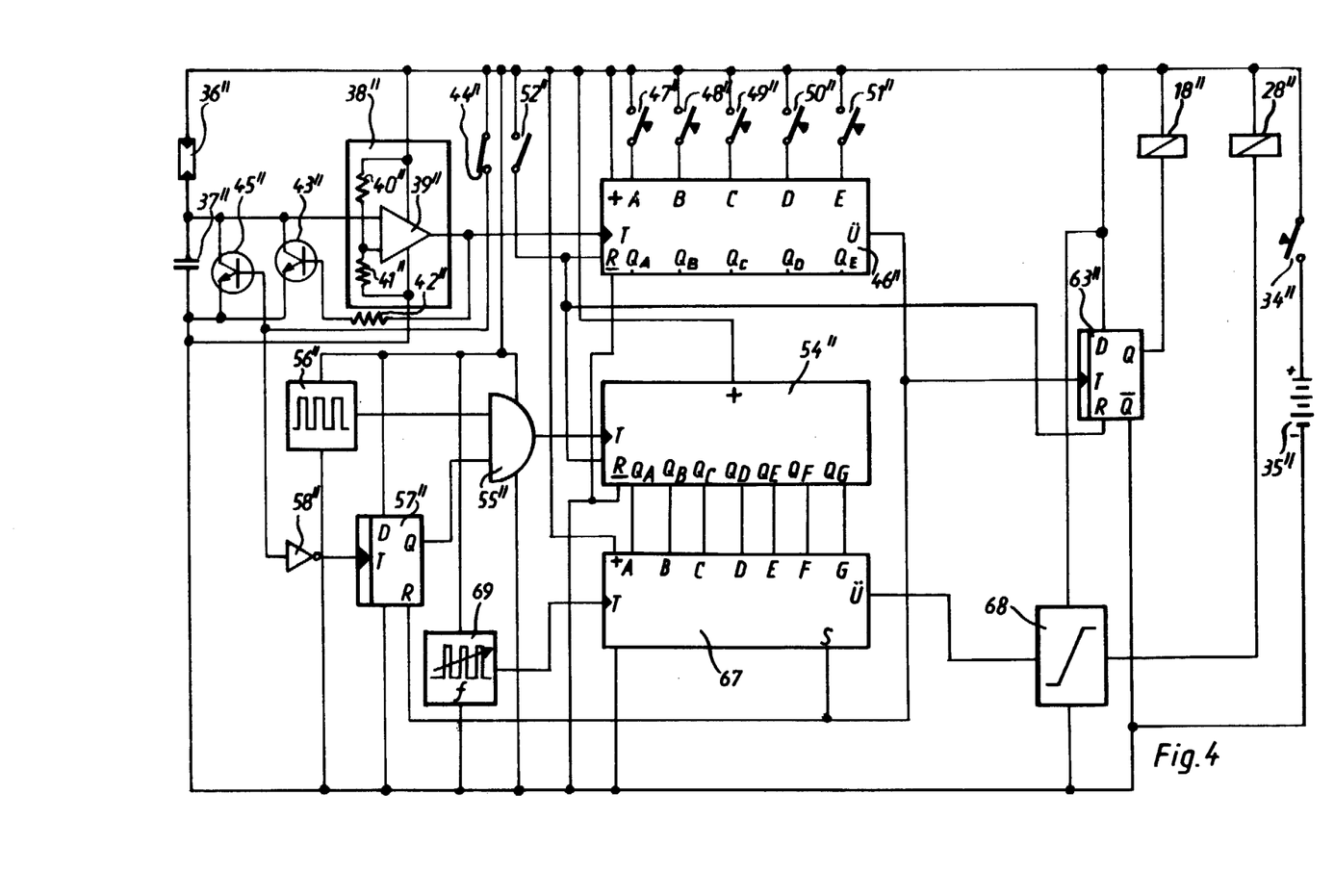
FIG. 4 is a view of a circuit diagram of a third embodiment for forming the exposure time value.

Also in the embodiment of FIG. 4 there are provided to the parts corresponding to the parts of FIG. 2 the same reference numerals. For purposes of distinction, however, these numerals are provided with indices.

A reversible counter 67 is employed in place of the digital-analog converter. The input signal combination of the reversible counter is stored upon appearance of a control pulse at the set input S. The transfer output of this reversible counter 67 is connected to a flip-flop stage 68, the output circuit of which comprises the exposure control closing magnet 28". The clock input of the reversible counter 67 is connected to a pulse generator 69 having an adjustable frequency and which exhibits a frequency adapted to the frequency of the pulse generator 56" depending on the run down characteristics of the diaphragm member.

Figure 5:
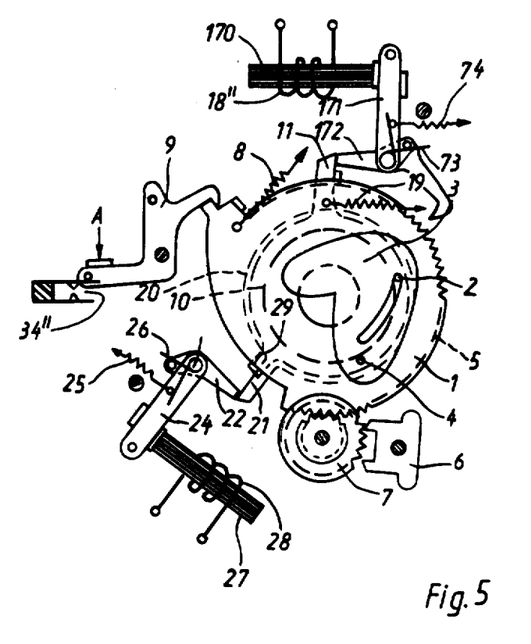
FIG. 5 is a view of a schematic representation of a shutter employing two electromagnets.

Instead of a diaphragm stop magnet 33 and an exposure opening release magnet 18 there is provided a single magnet, which comprises according to FIG. 5 a plunger 170, a plunger lever 171, a lever 172 rotatably disposed at the plunger lever 171 and where the end of the lever 172 engages the extension 11 of the shutter opening member. The other end is formed as a pawl, which engages the teeth 5 of the diaphragm member 1. A spring acting between the lever 172 and the plunger 171 is designated as 73. A spring 74 engages at the plunger lever.

A certain signal combination is counted into the time counter 54" depending on the illumination level. Upon appearance of a transfer pulse at the output of the diaphragm counter 46" the signal combination is entered into the reversible counter 67 or respectively stored there. Beginning with this point in time it is counted backward in the counter in the cycle of the pulses coming from the pulse generator 69, where the counter 67 generates a control pulse at its output U upon reaching of the zero position and the pulse causes the deenergizing of the shutter closure magnet 28".

Figure 6:
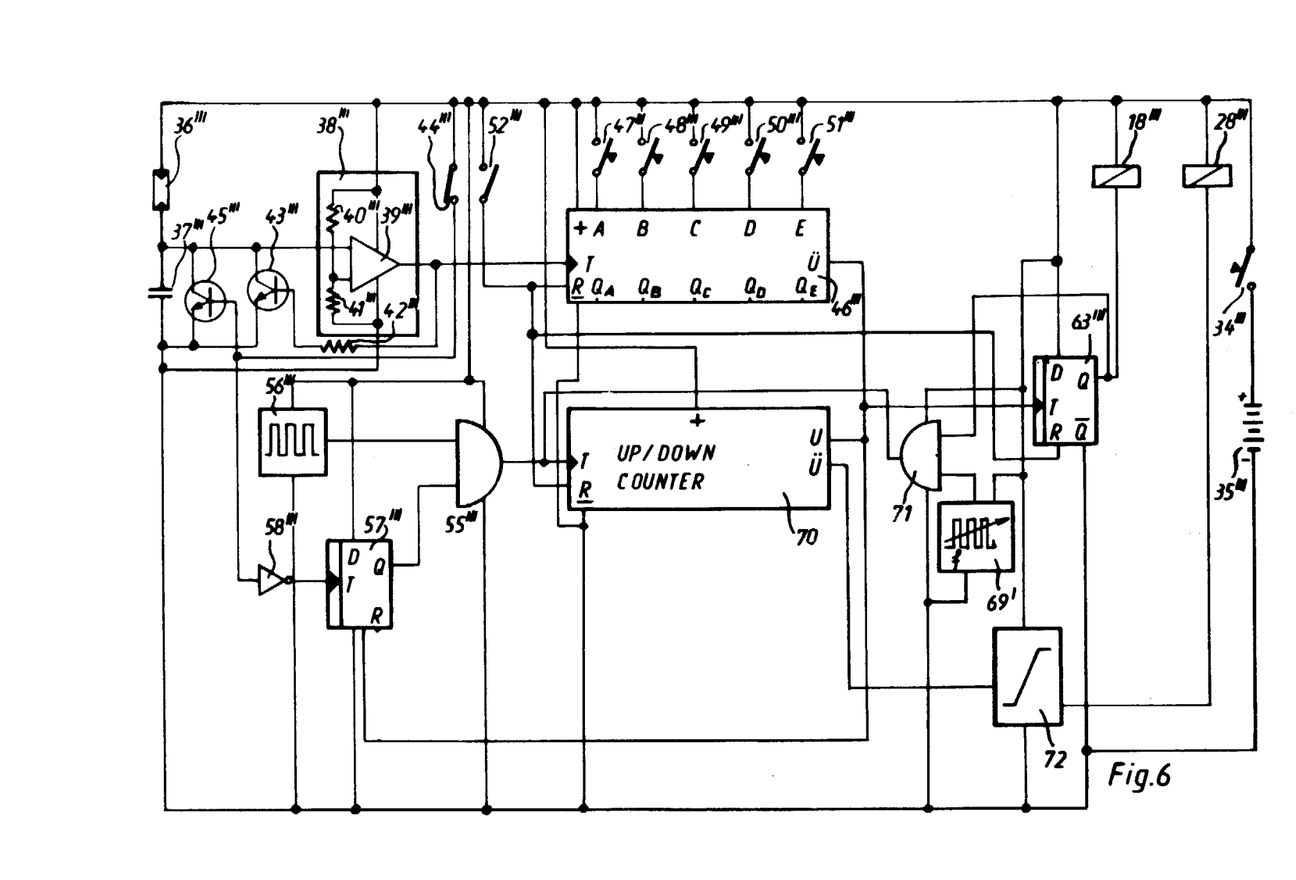
FIG. 6 is a view of a circuit diagram of a fourth embodiment for forming the exposure time value.

In the embodiment according to FIG. 6 the parts corresponding to parts of FIG. 2 are provided with the same reference numerals except for indices. A bidirectional counter 70 is employed for time counting up to the reaching of the diaphragm opening in each case, which counter is employed in reverse counting operation for the exposure time foramtion. The clock input T of this bidirectional counter 70 is in addition connected to the output of another AND gate 71. The first input of the AND gate 71 is connected to the output Q of the D-flip-flop 63''' and the second input of the AND gate 71 is connected to a pulse generator 69'. A flip-flop stage is designated as 72, which has its output connected to the shutter closure magnet 28'''. Upon closing of the starting switch 44''' the pulses of the pulse generator 56''' are counted into the counter 70. The counting direction is changed from forward operation to reverse operation at that point where the transfer output U of the diaphragm counting stage 46''' passes a control signal to the input U of the counter 70. This control signal occuring at the output U of the diaphragm counting stage 46''' provides also for feeding the plus potential at the input D of the D-flip-flop 63''' to the output Q. This potential jump effects a turn over of the AND gate 71 and thus the becoming effective of the pulse generator 69'. The control signal at the output U of the diaphragm counting stage 46''' blocks at the same time the AND gate 55''' such that the pulse generator 69' is effective instead of the pulse generator 56''' during the reverse counting of the counter 70.

It will be understood that each of the elements described above, or two or more together, may also find a useful application in other types of system configurations, photographic equipment and optical instruements differing from the types described above.

While the invention had been illustrated and described as embodied in the context of a photographic camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention.

What is claimed as new and desired to be protected by Letters Patent is set forth in the appended claims.

1. A photographic camera having an aperture diaphragm, a shutter control means and a diaphragm setting device, said diaphragm setting device comprising a light-sensitive circuit generating pulses; an electromagnetic diaphragm setting stage; a diaphragm counting stage connected to the light-sensitive circuit for comparing signals from the light-sensitive circuit with preset signals and for providing a stop pulse to the electromagnetic diaphragm setting stage; a pulse generator; a time counter connected via a stop control connection to the pulse generator and to the diaphragm counting stage; and said shutter control means comprising an exposure time forming stage connected via a start control connection to the output of the diaphragm counting stage.

2. The photographic camera according to claim 1 wherein the exposure time forming stage is connected to the counter for providing automatic setting of the time determining part of the exposure time forming stage depending on the counting stage of the counter.

3. The photographic camera according to claim 2, said shutter control means comprising
a shutter opening member connected to the diaphragm counting stage for receiving a control signal for the shutter opening member.

4. The photographic camera according to claim 3 further comprising
connection means between the exposure time forming stage and the counter for automatically adjusting the value of the time determining part of the exposure time forming stage depending on the counting value of the counter.

5. The photographic camera according to claim 4, said aperture diaphragm being connected to the electromagnetic diaphragm setting stage for providing a light dependent and automatic setting of the diaphragm.

6. The photographic camera according to claim 4 wherein the exposure time forming stage is connected for being turned on after the setting of the diaphragm.

7. The photographic camera according to claim 4 further comprising an amplifier connected to the electromagnetic diaphragm setting stage, and wherein the diaphragm counting stage comprises a reversible counter which can be set to a certain counting contents and the transfer output of which is connected to the amplifier.

8. The photographic camera according to claim 4 wherein the stop control connection comprises an AND gate having its output connected to the clock input of the time counter where the pulse generator provides a timing pulse and is connected to an input of the AND gate, where the cycle period is small compared to the shortest time for forming the diaphragm provided by the diaphragm counting stage; a memory flip-flop having its output Q connected to the second input of the AND gate and having its reset input R connected to the transfer pulse output of the diaphragm counting stage for switching off the memory flip-flop; and further comprising a starting switch connected to the light sensitive circuit and to the clock input of the memory flip-flop.

9. The photographic camera according to claim 8 wherein the memory flip-flop is D-flip-flop.

10. The photographic camera according to claim 4 wherein the exposure time forming stage comprises a digital-analog converter stage connected to an output of the counter;
   a voltage-current converter connected to the output of the digital-analog converter stage;
   a capacitor connected to the voltage-current converter; and
   a memory flip-flop connected to the voltage-current converter and connected to the electromagnetic diaphragm setting stage.

11. The photographic camera according to claim 10 wherein the digital-analog converter is connected with its set input S to the transfer output U of the diaphragm counting stage.

12. The photographic camera according to claim 4 wherein the exposure time forming circuit comprises
   a digital-analog converter connected to an output of the counter; and
   a memory flip-flop controlled through its set input S by the output voltage ($U_Q$) of the digital-analog converter serving as a threshold voltage $U_S$ and having a control input connected to a timing element comprising a capacitor and a resistor.

13. The photographic camera according to claim 4 further comprising
   a shutter closing magnet;
   wherein the light sensitive circuit generating pulses is provided as a second pulse generator having an adjustable frequency;
   wherein the exposure time forming stage comprises a reversible time forming counter connected to the output of the counter and the set input of the reversible time forming counter is connected to the transfer output U of the diaphragm counting stage and the clock input of the diaphragm counting stage is connected to the output of the second pulse generator and where the transfer output U of the time forming counter actuates the shutter closing magnet.

14. The photographic camera according to claim 1 said shutter control means comprising
   an opening mechanism controlled by the electromagnetic diaphragm setting stage.

15. The photographic camera according to claim 1 said shutter control means comprising
   a closing mechanism controlled by the electromagnetic diaphragm setting stage.

16. A method for controlling the exposure provided by a photographic camera comprising
   converting light radiation into electrical pulse signals;
   comparing the pulse signals with a preset count in a diaphragm counting stage;
   generating a stop pulse upon finding equivalence between the pulse signals and a preset condition;
   feeding the stop pulse to a diaphragm setting stage;
   feeding a control signal from the diaphragm counting stage to the release part of a shutter opening member;
   switching on a counter having a timing pulse generator at about the same time as the diaphragm counting stage;
   stop-controlling the counter with the output of the diaphragm counting stage;
   start-controlling an exposure time forming stage with the transfer output of the diaphragm counting stage; and
   automatically adjusting the value of the time determining member of the exposure time forming stage depending on the counting state of the counter.

17. The method for controlling according to claim 16 comprising
   feeding the transfer output of the diaphragm counting stage constructed as a reversible counter adjustable to a defined counting state contents via an amplifier to a diaphragm electromagnet.

18. The method for controlling according to claim 16 wherein the counter is switched on by
   feeding the signal from the timing pulse generator having a cycle period short as compared to the shortest time of formation of the diaphragm of the diaphragm counting stage to the input of an AND gate;
   feeding the output Q of a memory flip-flop to a second input of the AND gate;
   feeding the output of the AND gate to the clock input of the counter;
   switching on the memory flip-flop via its clock input T with a starting switch; and
   switching off the memory flip-flop via its reset input R through a transfer pulse of the diaphragm counting stage.

19. The method for controlling according to claim 16 further comprising
   feeding the output of the counter to a digital-analog converter stage;
   feeding the output of the digital-analog converter to a voltage-current converter;
   feeding the output of the voltage to current converter to a timing capacitor and to a following memory flip-flop;
   feeding the signal from the memory flip-flop to an electromagnet.

20. The method for controlling according to claim 19 further comprising
   feeding the output of the transfer output of the diaphragm counting stage to the set input of the digital-analog converter stage.

21. The method for controlling according to claim 16 further comprising
   feeding the transfer output of the diaphragm counter stage to the clock input of a second memory flip-flop for controlling the second memory flip-flop, the output of which is connected to a shutter release magnet.

22. The method for controlling according to claim 16 further comprising
    feeding the output of the counter to a digital-analog converter stage; and
    feeding the output of the digital-analog converter stage to a memory flip-flop as a control voltage for setting a threshold voltage.

23. The method for controlling according to claim 16 further comprising
    feeding the output of the counter to a time forming reversible counter;
    feeding the transfer output of the diaphragm counting stage to the set input of the time forming counter;
    feeding the output of a second adjustable pulse generator to the clock input of the time forming counter;
    actuating a shutter closing magnet by way of the transfer output of the time forming counter.

24. The method for controlling according to claim 23 further comprising
    adjusting the frequency of the adjustable second pulse generator depending on the characteristic course of the diaphragm setting member.

25. The method for controlling according to claim 23 further comprising
    adjusting the frequency of the adjustable second pulse genrator depending on the sensitivity of the film employed.

26. The method for controlling according to claim 16 wherein the automatic adjusting of the value of the time adjusting member is provided by
    feeding the output of a second AND gate to the clock input of a bidirectional counter;
    feeding an input of the second AND gate with the transfer output of the diaphragm counting stage via a second memory flip-flop; and
    feeding the transfer output of the diaphragm counting stage to the counting direction reversing input of the bidirectional counter;
    and wherein the switching on of the counter is provided by feeding the output of a third AND gate to the clock input of the bidirectional counter;
    feeding the output Q of a first D-flip-flop to an input of the third AND gate;
    feeding the output of the first pulse generator to an input of the third AND gate;
    switching the clock input of the first D-flip-flop with a starting switch; and
    feeding the transfer output of the diaphragm counting stage to the reset input R of the first D-flip-flop.

* * * * *